United States Patent [19]

Pressiat

[11] 4,112,294
[45] Sep. 5, 1978

[54] RADIANT ENERGY DETECTION SYSTEM FOR THE ANGULAR LOCATION OF A LIGHT-RADIATING OBJECT

[75] Inventor: Robert Pressiat, Paris, France
[73] Assignee: Thomson-CSF, Paris, France
[21] Appl. No.: 808,836
[22] Filed: Jun. 22, 1977
[30] Foreign Application Priority Data
Jun. 25, 1976 [FR] France .................................. 76 19422
[51] Int. Cl.² .................................................. G01J 1/20
[52] U.S. Cl. ........................... 250/203 R; 250/237 R; 356/152
[58] Field of Search .................... 250/203, 237 R, 225; 356/141, 152; 350/161

[56] References Cited
U.S. PATENT DOCUMENTS

| | | | |
|---|---|---|---|
| 3,932,039 | 1/1976 | Frey | 250/225 |
| 3,994,600 | 11/1976 | Tarasevich et al. | 356/152 |
| 4,009,393 | 2/1977 | Ashley et al. | 250/203 R |

Primary Examiner—David C. Nelms
Attorney, Agent, or Firm—Edwin E. Greigg

[57] ABSTRACT

A radiant energy detection system which allows angular location in bearing and elevation by using a simple detector element and a static mask preferably formed by a PLZT strip between two intersecting polarizers. A control circuit operates the mask to provide a configuration having a transparent zone equal to $n$ measurement quadrants ($n$ being a whole number equal to 1, 2 or 3) and an opaque zone equal to the remaining $4-n$ quadrants, and to bring about four successive operating states which are distinguished one from the next by an angular displacement of $\pi/2$ radians around the optical axis. The control circuit operates further a switching circuit synchronously with the mask to connect the output of the detector successively to four reception channels each of which includes a high speed memory. A measuring circuit calculates the angular location from the four detected signal values stored in the memory.

9 Claims, 13 Drawing Figures

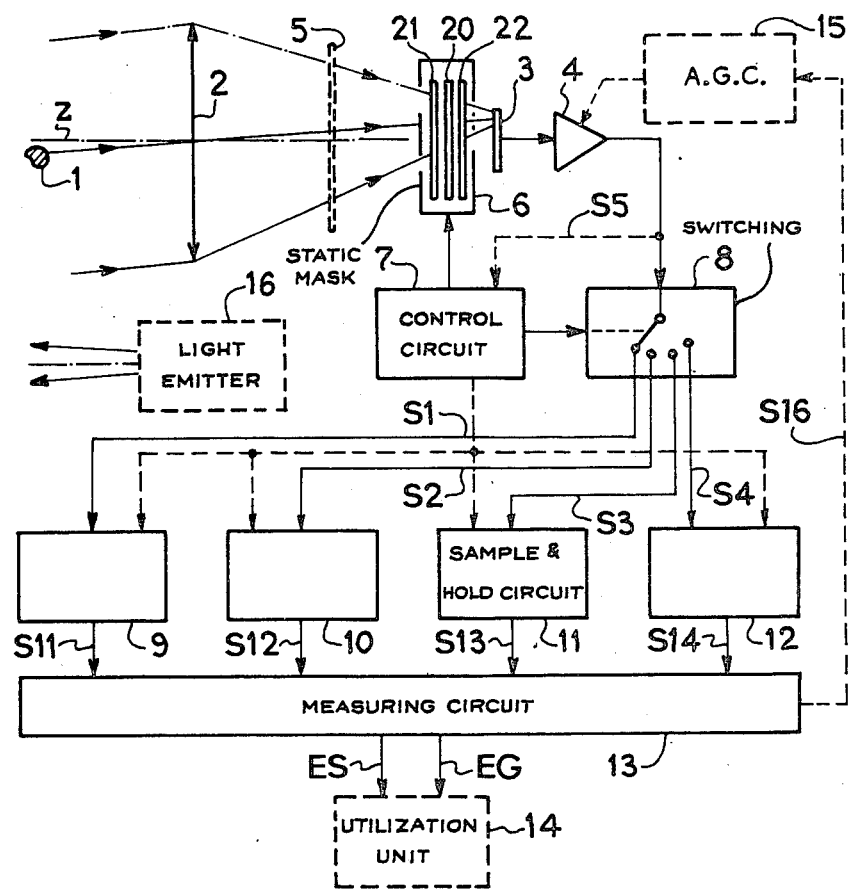
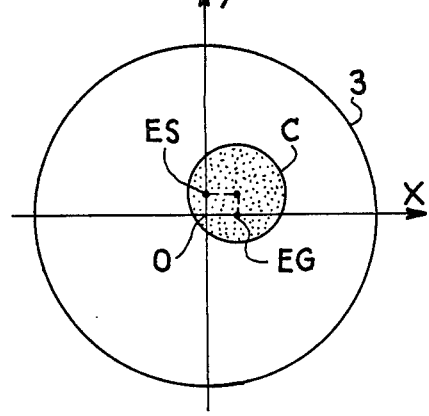
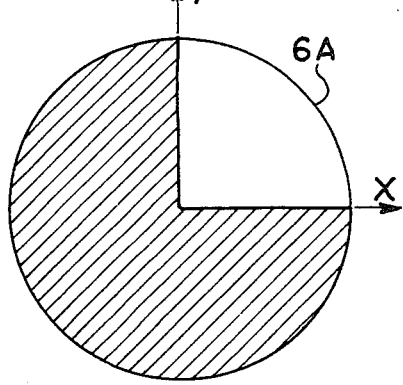

RADIANT ENERGY DETECTION SYSTEM FOR THE ANGULAR LOCATION OF A LIGHT-RADIATING OBJECT

BACKGROUND OF THE INVENTION

The present invention relates to a radiant energy detection system for the angular location of a light-radiating object.

The invention finds a particular application in the field of the opto-electrical detection and the tracking of a target which emits light or is remotely illuminated and it is also applicable to automatic means for guiding a missile such as a semiactive homing head.

In such systems, an optical receiver focuses the useful radiation from the light-radiating object to be located onto a detecting device. The detector is usually associated with a moving mask which has transparent areas on an opaque background in various forms such as grids, optical tracks, sectors, etc. The combination of the detector and mask is calculated to allow the requisite location data to be obtained by processing the detected signals. These data are in general the co-ordinates of the image of the object in the detection plane relative to two cartesian reference axes X and Y, that is to say the elevation and bearing of the object, which correspond to the aiming error between the optical line of sight of the receiver and the direction in which the remotely situated object lies in the observed field.

There exist various embodiments of such systems, in which the detection device generally consists of a plurality of detecting elements. For example, an array of detectors lies in one of the reference directions X and Y and an array of slots or an optical track is movable in the second direction of measurement. The detection device may contain a single optical element provided that the mask incorporates a plurality of different optical tracks.

According to other embodiments, the detector device comprises four detection quadrants and there is no associated mask, processing on the four detection channels being by sum and difference formation to enable the requisite divergence values to be obtained.

An object of the invention is to provide a location system of low cost and fairly simple design which can be installed on board a moving object, such as a homing head for example, so as to operate in particular on a light-radiating object which may be formed by a source emitting light pulses. In this case, the system includes a detector which has only one photosensitive element and which is associated with a particular mask produced in a static form.

In accordance with a feature of the invention, there is provided a radiant energy detection system for the angular location of a light-radiating object, combining: an opto-electrical receiver comprising an optical arrangement for focussing the radiation from the said object onto a photosensitive detector element centered on the optical axis through a mask device which is controlled by an associated electrical control circuit. There are also provided circuits for processing the detected signal to generate signals representing the divergences in bearing and elevation for the object being aimed at; the said mask being a static device controlled to present a configuration having a transparent area corresponding to $n$ measurement quadrants ($n$ being a whole number at least equal to 1 and at most equal to 3) and an opaque area formed by the remaining $4-n$ measurement quadrants. The control circuit provides four successive operating states which are distinguished from one another by a rotation of $\pi/2$ radians of the configuration around the optical axis, and the processing circuits including a switching circuit operated synchronously with the mask by the control circuit to connect successively the output of the detector element to four reception channels which supply a divergence measuring circuit.

The invention will now be further described with reference to the accompanying drawings.

BRIEF DESCRIPTION OF THE DRAWING

The drawing includes:

FIG. 1, a general diagram of a location system according to the invention;

FIG. 2, a view of the detection plane;

FIGS. 3, 4 and 5, configurations envisaged for the mask device used in the system;

DESCRIPTION OF THE PREFERRED EMBODIMENTS

Figure 4:
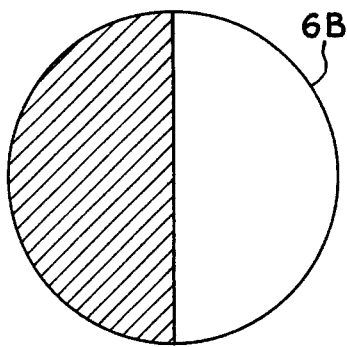

Referring to the simplified diagram shown in FIG. 1, which shows the main components forming a locating system according to the invention, the light-radiating object 1 is assumed to be situated in the reception field and to be radiating light waves in this field either directly or by reflection. These waves, or that fraction of the waves which is received by the optical receiver, form the useful radiation to be detected. The optical receiver consists of an optical focussing device represented by the objective 2. The detecting device 3 is positioned parallel and close to the corresponding focal plane so that the image of the object is formed on it as a spot of predetermined diameter.

In accordance with the invention, the detector 3 consists of a single photosensitive element. This element is connected to pre-amplifier and amplifier circuits indicated at 4.

The expected useful radiation, or at least the wave band in which it lies, is generally known. Consequently, a selection operation is performed on the received radiation so as to eliminate ambient interference radiation, or at least the major proportion thereof; this selection operation usually being performed by optical filtering using a filter device 5 inserted in the optical path.

The detector 3 is preceded by a mask device 6 controlled by an arrangement 7. The combination of 6 and 7 is so calculated as to cause sequentially at the detector 3, a law of discontinuous illumination determined from the four measurement quadrants. The receiver circuits downstream of the amplifier 4 being arranged accordingly, the principle of operation of elements 3 and 6 will first be explained.

FIG. 2 shows the image of the object in the detection plane at C, the photosensitive area of the detector 3 defining the image of the observed field. This area may be circular as shown or may be of some other shape, such as rectangular for example. Point O represents the location of the optical axis Z of the system and OX and OY represent the reference axes for measurement. The co-ordinates ES and EG of the centre of the spot C represent the amounts of aiming error in elevation and bearing respectively.

Figure 5:
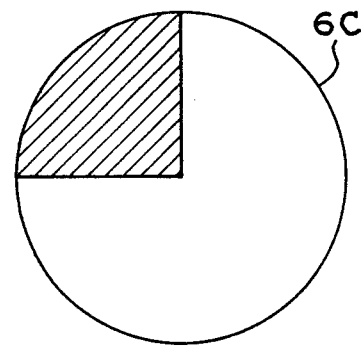
Figure 6:
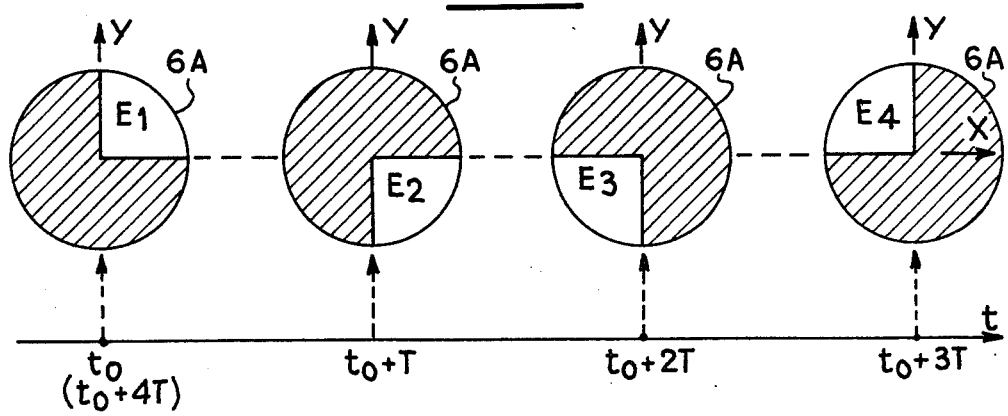
FIG. 6, the operation of the mask device of FIG. 3.

The mask 6 is designed to produce one of the configurations 6A, 6B and 6C shown in FIGS. 3, 4 and 5. To simplify the explanation, it will be assumed that the configuration 6A of FIG. 3 is produced which has a transparent zone corresponding to one measurement quadrant and an opaque zone corresponding to the three remaining quadrants. Mask 6A is operated sequentially by the control circuit 7 so as to assume four successive operating states which are distinguished from one another by a rotation of $\pi/2$ around the optical axis. These states are shown in FIG. 6 at the successive times $t_o$, $t_o+T$, $t_o+2T$, $t_o+3T$, the initial state being repeated at time $t_o+4T$ and so on.

If the corresponding amounts of detected light energy are called E1, E2, E3, E4 respectively, the divergences ES and EG are given by: $ES = (E1 + E4) - (E2 + E3)$, and $EG = (E1 + E2) - (E3 + E4)$, assuming that the useful radiation received does not vary, i.e. the sum $ET = E1 + E2 + E3 + E4$ remains substantially constant.

Consequently, the receiver circuits are arranged to produce four reception channels and to allow the aforementioned measurements ES and EG to be made. They include a switching device 8 which is supplied with the detected signal after it has been amplified in circuit 4, and which has four outputs. The switch 8 is operated by the control circuit 7 in synchronisation with the mask 6 so as to switch the detected signals S1, S2, S3 and S4, corresponding to the above values E1, E2, E3 and E4 onto successive ones of the four output channels. These signals are applied, via high-speed memory circuits 9 to 12 which may consist of circuits of the sample-and-hold kind controlled by the circuit 7, to a circuit 13 termed a divergence measuring circuit to measure the divergences, which circuit produces signals representing the aiming error in elevation ES and in bearing EG.

Block 14 represents the ancillary user unit which may consist of a display device or of tracking means to slave the sighting axis Z to the direction in which the object lies. Also shown are an automatic gain control circuit at 15 to control a variable gain amplifier at 4 from signals representing the total amount of detected energy ET, and a remotely situated emitter at 16 which illuminates the object 1 when the latter does not have a source to emit useful radiation to be detected.

It will readily be appreciated that the configurations 6B (FIG. 4) and 6C (FIG. 5) allow divergence measurements ES and EG to be made in the same way. In comparison with configuration 6A, twice as much energy is received in the case of 6B and three times as much as in the case of 6C in the course of a given sequence 4T. Configuration 6C is thus the most advantageous of the three.

It will be clear from what has just been said and from the sequential mode of operation of the mask 6 that when, in addition, the useful radiation is emitted in a pulsed fashion with a period of T, the system is particularly beneficial if reception is synchronised with the incident light pulses.

Figure 7:
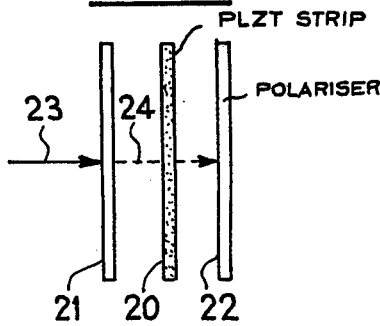
FIGS. 7 and 8, the operation of a static mask device produced by means of a PLZT ceramic and polarizers.
Figure 8:
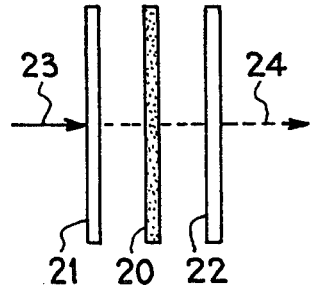

The mask 6 is produced in the form of a static device produced by means of ceramics which exhibit transparent or birefringent properties when subjected to an electrical field. Such ceramics cause the plane of polarization of incident light to be rotated by an angle which is a function of the locally established electrical field. The electrical fields are obtained by applying predetermined voltages to a circuit deposited on the surface of the ceramic. Ceramics known by the abbreviation PLZT have these properties. If a ceramic 20 of this nature, in the form of a PLZT strip for example, is assumed to be arranged between two polarizers 21 and 22 which intersect at $\pi/2$, the resulting operation is that briefly described below with reference to FIGS. 7 and 8. In the case of FIG. 7 there is no applied electrical field and the incoherent incident light 23 is polarized by element 21, the resulting polarized light 24 is not affected by the PLZT strip and is stopped by polarizer 22. By applying an electrical field E of predetermined magnitude as in FIG. 8, the plane of polarization of the light 24 is rotated by $\pi/2$ and the light then passes through the second polarizer 22. Such an arrangement is described inter alia in the journal "Applied Optics" volume 14, No. 18 of August 1975, on pages 1866 to 1873 on which appears an article "PLZT electro-optic shutters application" by J. Thomas Cutchin, James O. Harris and George R. Laguna.

Figure 9:
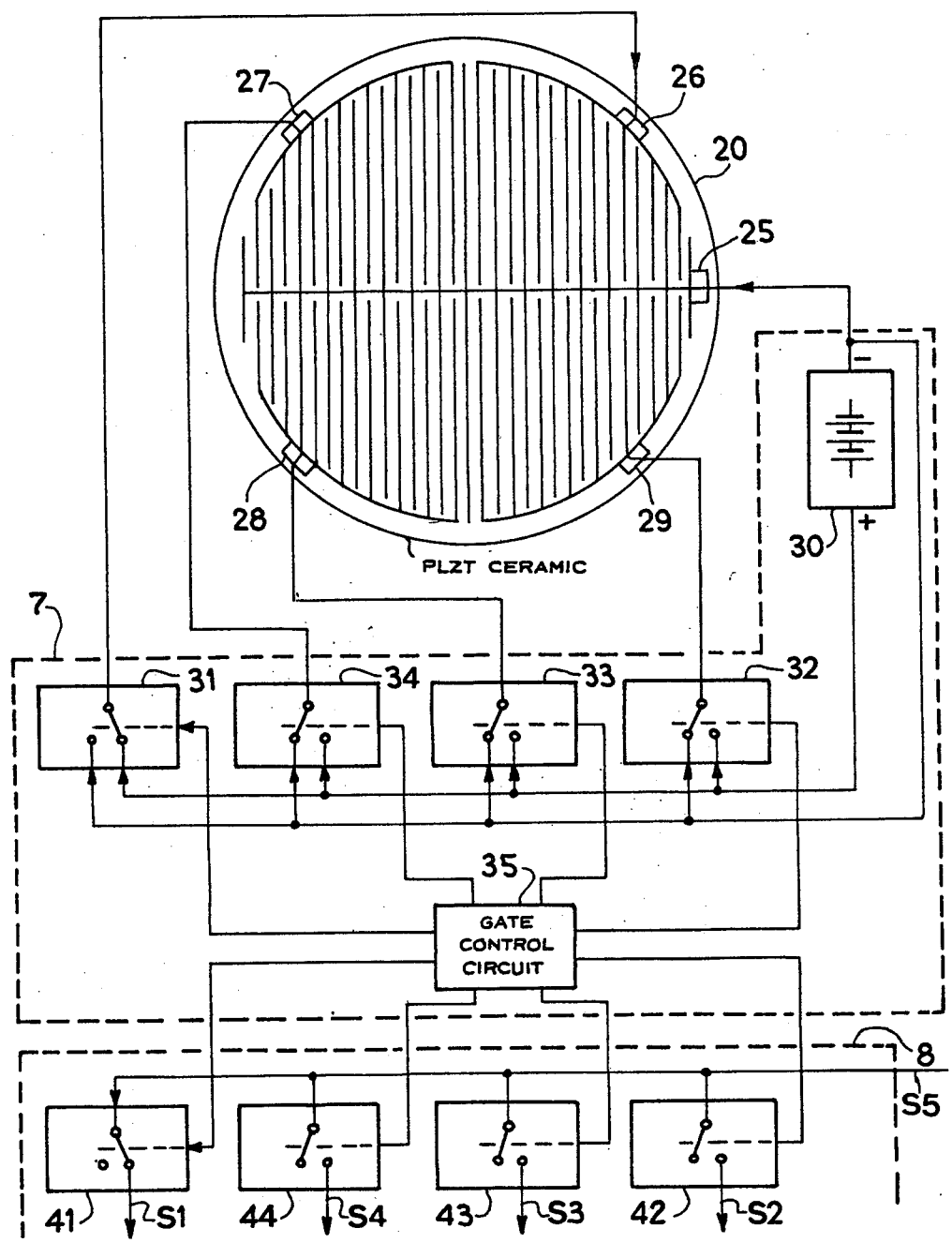
FIG. 9, an embodiment of a mask device as shown in FIGS. 3, 6, 7 and 8 and of its control circuit.

To enable the four measurement quadrants to be selected in space, the circuit deposited on the PLZT strip may be produced in the form shown in FIG. 9 by means of electrodes forming interlocking arrays. The electrical field in the quadrant or quadrants concerned is produced by a DC source 30 and a combination of gate circuits 31 to 34 controlled by a circuit 35. The connections shown correspond to operation with the configuration shown in FIG. 3. A simple permutation of the inputs to gates 31 to 34 would produce the preferred mask configuration of FIG. 5. The four states shown in FIG. 6 are produced by operating the gate circuits 31 to 34 in succession by means of circuit 35 at times $t_o$, $t_o+T$, etc. The combination 30 to 35 corresponds to the control circuit 7 in FIG. 1. The switching circuit 8 may be produced in a similar fashion by means of four gate circuits 41 to 44 which are operated in succession by circuit 35. The control outputs are shown separately from those intended for gate circuits 31 to 34 to indicate that there are delays due to the upstream circuits 6, 3 and 4. The gate circuits may for example be produced from field effect transistors.

Figure 10:
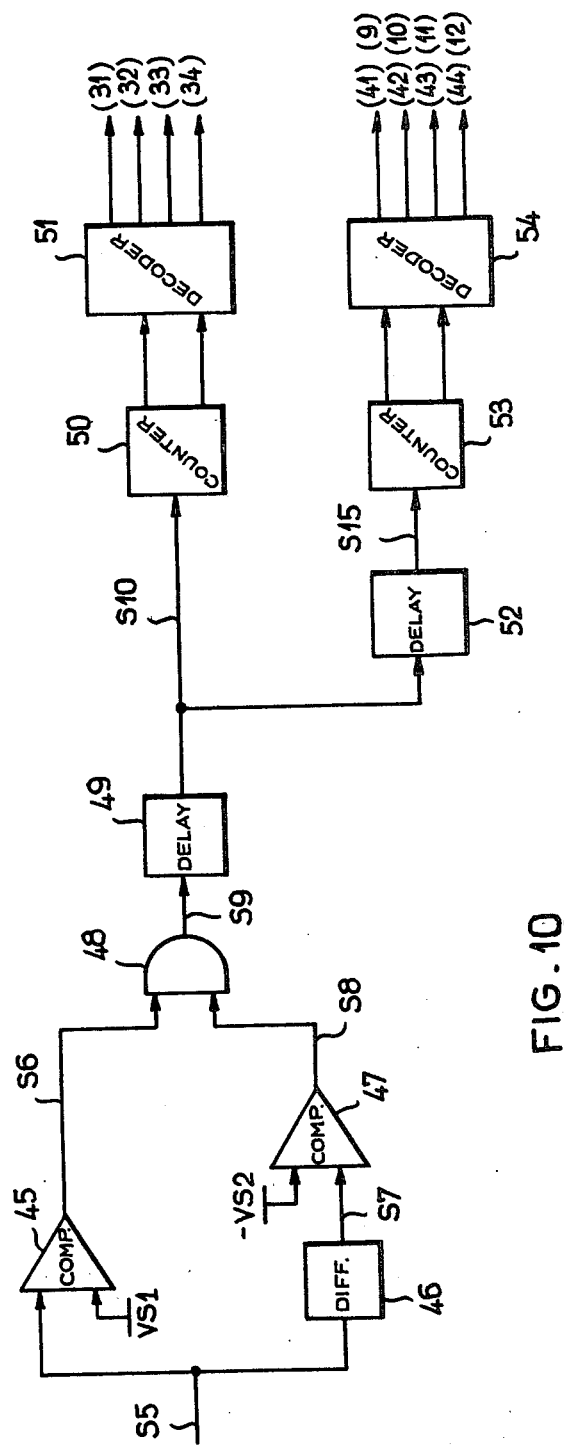
FIGS. 10 and 11, part of an embodiment of an arrangement for controlling the mask and operating waveforms relating thereto.
Figure 11:
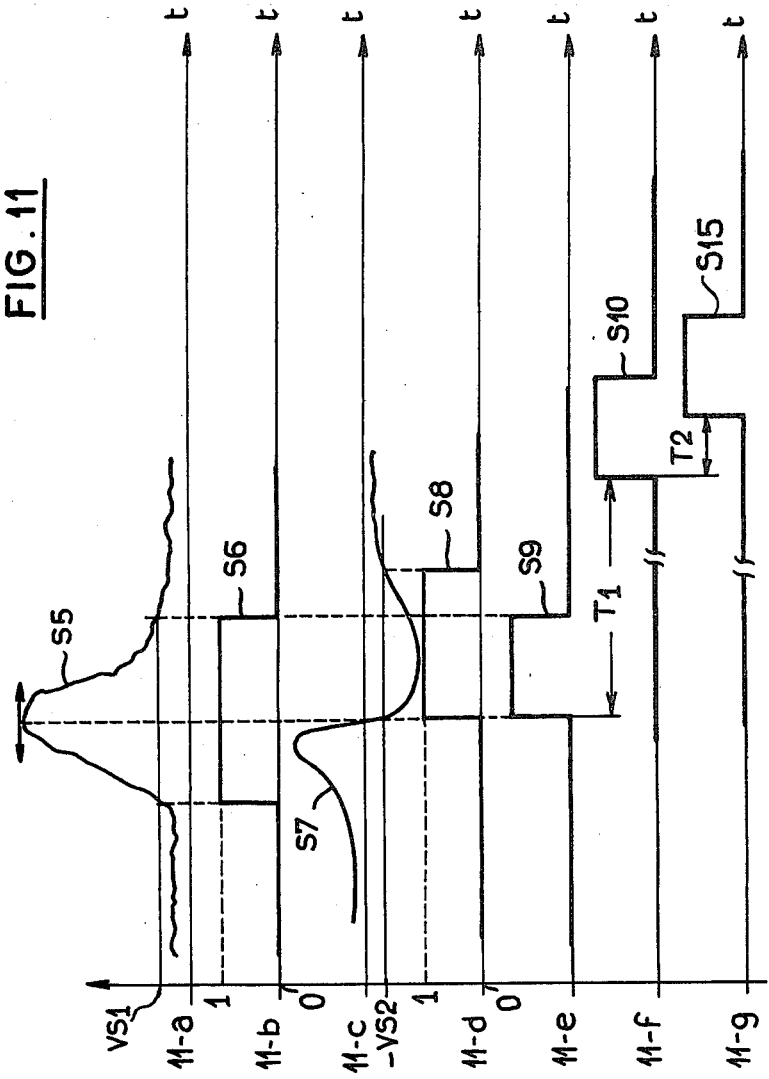

An embodiment of the control circuit 35 is shown in FIG. 10 and FIG. 11 relates to the operating waveforms. Emission is assumed to be of the pulsed type. Synchronization between the actuation of the mask 6 and the reception of the useful signal at emission period T is achieved by applying the detected signal S5, after suitable amplification, to the control circuit 7 (the connection shown as a broken line in FIG. 1). In circuit 35, the signal S5 (FIG. 11a) is compared with a predetermined positive threshold VS1 in particular to allow for the noise level. The comparison takes place in a comparator 45 of the logic-output kind which emits a signal S6 (FIG. 11b). In addition, the signal S5 is applied to a differentiating circuit 46 whose output signal S7 (FIG. 11c) is compared with a negative threshold - VS2 in a second logic-output comparator 47. The comparison outputs S6 and S8 (FIG. 11d) are applied to an AND circuit 48 whose output signal S9 (FIG. 11c) is applied to a first delay circuit 49. The latter is calculated to produce a delay T1 equal to the emission period T less the response lag T2 resulting from the combination of the immobile mask 6, the detector 3 and the amplifier 4, the lag T2 being mainly due to the mask device 6. The value of T2 is also adjusted in such a way that the resultant signal S10 (FIG. 11f) is approximately central to the useful signal S5 subsequently obtained. A matching circuit, such as a monostable device, may be provided to adjust the length of this signal to that Ti of the emitted pulse. The signal S10 is applied to a logic circuit 50 which counts up to four, followed by a four-output decoding circuit 51 to identify the four successive values of count. The outputs of the decoder 51 control respective ones of the gate circuits 31 to 34 (FIG. 9). The signal S10 is also applied to a second delay circuit 52 where it is subjected to a delay equal to the aforementioned lag T2. The resulting signal S15 (FIG. 11g) is processed in the same way by means of a count-up-to-four circuit 53 followed by a decoding circuit 54 to produce the outputs for controlling the gate circuits 41 to 44 (FIG. 9) and the sample-and-hold circuits 9 to 12 (FIG. 1). In fact, additional delay circuits which are not shown may be inserted in the control connections to circuits 9 to 12 to allow for the delay due to gate circuits 41 to 44 and to ensure that the sample-and-hold circuits select the peak value of the useful signal S5.

The form taken by the circuits 9 to 12 of FIG. 1 depends upon whether the mode of emission is continuous or discontinuous. The function of these circuits is to store the value of the detected signal until the next operating sequence, each sequence lasting for a period of 4T during which the mask assumes its four successive operating states.

Figure 12:
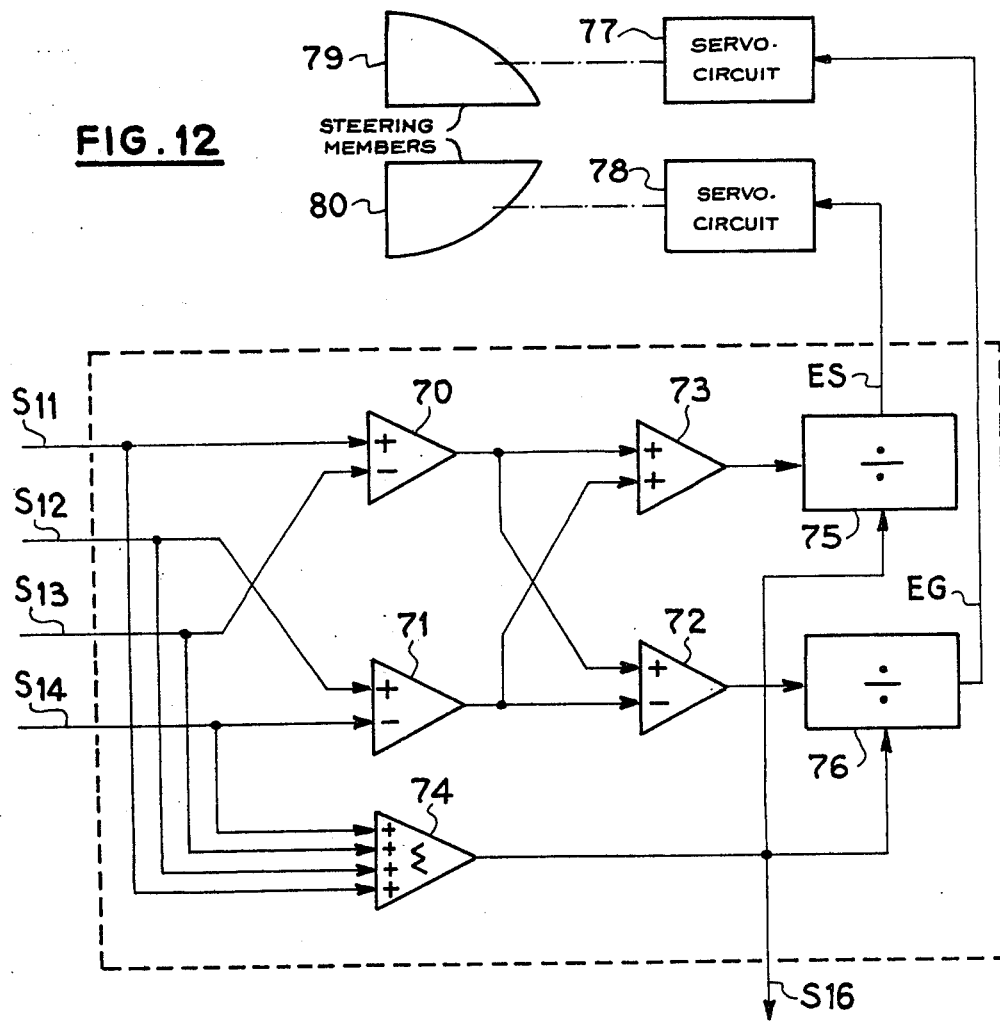
FIG. 12, an embodiment of the divergence measuring circuit with which the system is equipped and of ancillary user circuits in the context of an application to a homing head.

FIG. 12 is a diagram of an embodiment of the measuring circuit 13 of FIG. 1 which, from the signals S11 to S14 representing the respective detected levels in the four operating states, produces signals representing the co-ordinates for the bearing divergence EG and elevation divergence ES of the object 1. These signals are produced by calculating the ratios:

$$EG = \frac{(S11 + S14) - (S12 + S13)}{(S11 + S12 + S13 + S14)} \text{ for bearing}$$

and $$ES = \frac{(S11 + S12) - (S13 + S14)}{(S11 + S12 + S13 + S14)} \text{ for elevation}$$

when the optical configuration of the mask is that shown either in FIG. 3 or FIG. 5. These ratios are calculated by means of elements which, as shown, consist of differential amplifying circuits 70, 71 and 72, adding circuits 73 and 74, and dividing circuits 75 and 76. Elements 70 to 76 may easily be formed by means of integrated circuits. In fact the values of the aforementioned ratios when obtained, have been multiplied by a coefficient which corresponds to the gain of the systems represented by 70, 71, 73 and 75 in the case of bearing.

When the configuration of the mask is that of FIG. 4, the divergence signals are given by simpler formulae, the numerators becoming S11–S13 for the bearing divergence and S14–S12 for the elevation divergence, and circuit 13 is simplified to the extent that elements 72 and 73 are not needed under these circumstances.

The signal S16 which is intended for the AGC circuit 15 (FIG. 1) to allow the receiver gain to be controlled may be formed by the sum output. The AGC circuit is produced by known techniques and operates by threshold comparison for example to produce a signal for controlling the gain of amplifier 4.

The outputs ES and EG may be applied to slaving circuits 77, 78 to produce a desired technical effect, for example automatic tracking by adjusting the line of sight Z in directions X and Y. In the application to a homing head which is envisaged, the slaving circuits 77, 78 control members such as ailerons 79, 80 to control the direction of the missile. This control will be exercised in particular as determined by the type of operation selected, such as proportional navigation or tracking navigation.

The static mask arrangement has further advantages. The range of control provided by the applied voltages allows one or more quadrants to be rendered opaque or transparent; all the quadrants may thus be rendered opaque or transparent. This property is useful in the case where the application is to a homing head since the whole of the mask device may thus be made transparent to produce an initial locking-on or acquisition phase.

Figure 13:
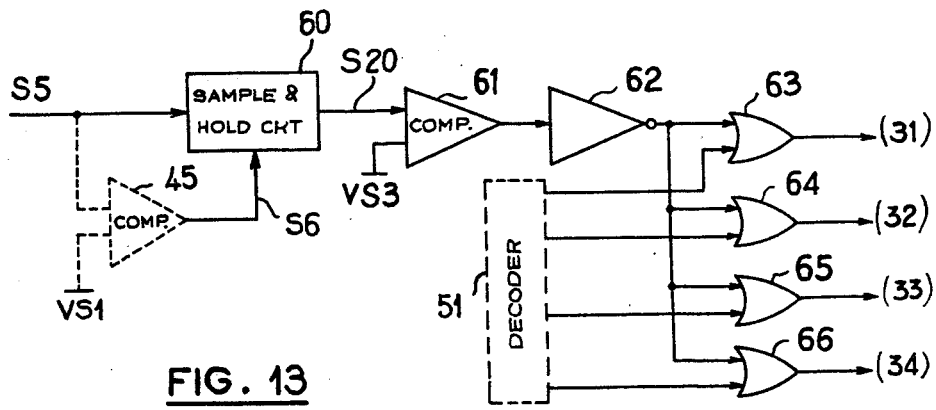
FIG. 13, an embodiment of a locking-on arrangement which may be incorporated in the location system.

By way of example, FIG. 13 shows an embodiment of a locking-on arrangement. A sample-and-hold circuit 60 receives the detected and amplified signal S5 and is controlled by the output S6 of the previously mentioned comparator 45. The output signal S20 from the sample-and-hold circuit is compared with a positive threshold VS3 in a logic-output comparator circuit 61. Threshold VS3 is made lower than the threshold VS1 for comparator 45. Comparator 61 is followed by an inverter circuit 62 whose output is applied simultaneously to first inputs of four OR circuits 63 to 66. These OR circuits have second inputs which are supplied by respective outputs of decoder circuit 51 (FIG. 2).

Operation is as follows: If signal S5 is lower than the detection threshold VS1, sample-and-hold circuit 60 is not actuated. If it is assumed that the signal S5 also fails to reach the threshold VS3, the OR circuits then receive a "1" signal at their first inputs. The result is that gates 31 to 34 are all actuated simultaneously and terminals 26 and 29 of the mask (FIG. 9) all receive a supply, the mask being made completely transparent. As soon as the level of S5 exceeds VS1, circuit 60 is actuated and the OR circuits are then operated in succession by the corresponding "1" outputs from the decoder to cause the mask to operate normally.

In the event of the lock-on being lost, that is to say when the useful signal drops below VS1 for a number of cycles T, circuit 60 is no longer actuated and signal S20 gradually declines in a discharge process. As soon as the level of S20 becomes lower than VS3, all the gate circuits 31 to 34 are again operated by the outputs of OR circuits 63 to 66. This general actuation ceases when lock-on again takes place. The arrangement is made such that a loss of lock-on is recognized after a delay of at least four periods T. It may in fact be that, in the case of a mask as shown in FIG. 3, the image spot forms in only one quadrant and there is no useful signal during three successive periods. The locking-on arrangement is prevented from operating at the wrong time by fixing the following parameters: the emission period T, the threshold VS3 and the selection of the sample and hold circuit 60.

For applications to automatic target tracking, the emitter may be mechanically attached to the receiver and may move conjointly therewith. Another possibility is a separate emitter which is trained on the target independently by suitable means. Likewise, applications may be envisaged in which the emitter is on board the target and emits in a virtually omnidirectional or low-directivity pattern. In other applications, the emitter may be positioned in isolation from the receiver near to or remotely therefrom, the receiver being on board a moving vehicle which is to be steered toward a predetermined target.

In conclusion, the respective positions of the emitter section and the receiver section depend mainly on the application envisaged and may take various forms among which are those described and those mentioned above.

In certain of these embodiments, the system may possibly include means for generating a range-finding window so that the target is only detected within a restricted range band as far as the receiver is concerned.

The term light-radiating object should not be considered as a restriction to the visible spectrum and it also covers, in particular, the infra-red range.

The choice ceramic material for use in producing the static mask depends in particular on the spectral waveband intended for operation. The PLZT ceramics which were taken as an example allow operation in the visible and near infra-red spectrum up to 2 to 3 microns.

It is also understood that the embodiment described is not to be considered as exhaustive and that it is capable of modifications conforming to the features of the invention and which also form part of the invention.

What is claimed is:

1. A radiant energy detection system for determining the angular location of a light radiating object, comprising, in combination: an opto-electrical receiver including, successively, an optical arrangement for focussing the radiation from the said object, a mask device of a static type controlled by an associated electrical control circuit, a photosensitive detector element centered on the optical axis and circuits for processing the detected signal to provide signals representing the divergence in bearing and elevation for the object being aimed at; the said static mask being controlled to present a configuration having a transparent area corresponding to $n$ measurement quadrants ($n$ being a whole number at least equal to 1 and at most equal to 3) and an opaque area formed by the remaining $4-n$ measurement quadrants, said control providing four successive operating states which are distinguished from one another by an angular displacement of $\pi/2$ radians of the said configuration around the optical axis, and the said processing circuits including a switching circuit operated synchronously with the said static mask by the said control circuit to connect successively the output of the detector element to four reception channels each including a memory circuit for storing the detected signal value of a corresponding operating state, said reception channels serving to supply inputs to a divergence measuring circuit for measuring the said divergences from four detected signal values.

2. A system as in claim 1, intended to locate an object radiating cyclic light pulses, wherein the output of the detector is connected to the said control arrangement to cause the said mask to be operated synchronously with the successive times of reception of the said light pulses, said memory circuit being formed by means of four sample-and-hold circuits which are actuated one after another in synchronization with the said times of reception of successive pulses.

3. A system as in claim 2, wherein the static mask device comprises a strip of PLZT ceramic material which has the properties of transparency and birefringence by application of an electrical field.

4. A system as in claim 3, wherein the said strip is positioned between two intersecting polarizers and carries a deposited circuit which forms four interlocking arrays which are laid out in the four measurement quadrants, and in that the said control circuit includes DC supply means to feed the said arrays in a predetermined order and to produce the said four successive operating states.

5. A system as in claim 4, wherein the said supply means include a DC source which is connected at one end to a common supply terminal for the said arrays, and at the other end to four individual terminals for the said arrays via respective ones of four gate circuits and a control circuit to operate the said gate circuits sequentially and to feed the arrays consecutively in the desired order.

6. A system as in claim 5, wherein the said control circuit allows three arrays to be supplied to produce a mask having a preferred configuration involving three transparent quadrants ($n = 3$).

7. A system according to claim 6, wherein it includes locking-on means to bring about a preliminary phase in which the object in the observed field is acquired, the said locking-on means operating by performing a threshold comparison on the value of the detected signal so as to actuate the four arrays of the mask in place of the said supply circuit and to make the whole of the mask transparent during the said acquisition phase.

8. A system as in claim 1, intended more particularly to produce a semi-active homing head, wherein the said divergence signals supply servo-controls to control the position of steering members, and wherein the light pulses are produced by a remotely situated emitter which illuminates the object to be located.

9. A system for automatically tracking a light radiating object incorporating a locating arrangement as in claim 1, wherein the said divergence signals supply the positional servo-controls to hold the optical line of sight pointing in the direction of the object being aimed at.

* * * * *